United States Patent
Chung

(10) Patent No.: US 9,455,847 B1
(45) Date of Patent: Sep. 27, 2016

(54) WIRELESS COMMUNICATION APPARATUS WITH PHASE NOISE MITIGATION

(71) Applicant: Sanguoon Chung, San Diego, CA (US)

(72) Inventor: Sanguoon Chung, San Diego, CA (US)

( * ) Notice: Subject to any disclaimer, the term of this patent is extended or adjusted under 35 U.S.C. 154(b) by 0 days.

(21) Appl. No.: 14/809,489

(22) Filed: Jul. 27, 2015

(51) Int. Cl.
  *H03H 7/30* (2006.01)
  *H04L 25/03* (2006.01)
  *H04L 5/00* (2006.01)
  *H04L 7/033* (2006.01)

(52) U.S. Cl.
  CPC ......... *H04L 25/03057* (2013.01); *H04L 5/006* (2013.01); *H04L 7/033* (2013.01)

(58) Field of Classification Search
  CPC .. H04L 25/03057; H04L 7/033; H04L 5/006
  See application file for complete search history.

(56) References Cited

U.S. PATENT DOCUMENTS

| | | | | |
|---|---|---|---|---|
| 2003/0016770 A1* | 1/2003 | Trans | ...... | H04B 1/00 375/346 |
| 2004/0184522 A1* | 9/2004 | Kravtsov | ...... | H04L 25/03057 375/233 |
| 2005/0157820 A1* | 7/2005 | Wongwirawat | ..... | H04L 25/0307 375/326 |
| 2007/0201544 A1* | 8/2007 | Zhu | ...... | H04L 25/03057 375/229 |
| 2008/0107168 A1* | 5/2008 | Xia | ...... | H04L 25/03057 375/233 |
| 2009/0245448 A1* | 10/2009 | Ran | ...... | H04L 25/03057 375/373 |
| 2014/0126675 A1* | 5/2014 | Monsen | ...... | H04L 25/03012 375/350 |

\* cited by examiner

*Primary Examiner* — Kenneth Lam
(74) *Attorney, Agent, or Firm* — Clement Cheng

(57) ABSTRACT

The present invention is a method and apparatus for mitigating phase noise in data communication systems. The present invention provides effective phase noise mitigation with very low latency by combining the decision feedback equalizer and carrier recovery loop effectively. The phase noise estimate is obtained by calculating the phase difference between the input and output of the decision device (DD) in the decision feedback equalizer (DFE) and then applying a digital phase locked loop (DPLL) on the phase difference. Deriving the phase noise estimate from the phase noise estimation process, phase noise mitigation is obtained by multiplying the phase noise estimate at the input signal of the feedforward filter (FFF) and at the input signal of the DD in DFE. An accurate signal-to-noise ratio (SNR) estimate is also obtained in the process of the filter coefficient update process in the DFE.

18 Claims, 3 Drawing Sheets

WIRELESS COMMUNICATION APPARATUS WITH PHASE NOISE MITIGATION

FIELD OF THE INVENTION

Phase noise is one of the most critically destructive noises affecting the performance of wireless high speed communication systems. In the general application area, a higher speed communication system requires the use of a higher order QAM (quadrature amplitude modulation) system. We need to use more accurate and more recently measured (i.e., low latency) phase noise estimates for a higher order QAM to mitigate the phase noise effect on the signal. The present invention provides an effective phase noise mitigation approach with good accuracy and very low latency.

DISCUSSION OF RELATED ART

The need to increase the channel data rate in data communication systems without increasing the signal bandwidth drives the development toward more spectrally efficient modulation formats. QAM modulation is widely used in digital wireless communication systems for achieving high data transmission rates over relatively narrow signal bandwidth. Digital radio systems designed using such modulation schemes must balance the effects of phase noise from local oscillators with the demodulator parameters in determining overall performance. In a M-QAM system each symbol transmitted contains k bits, where $2^k=M$. In contrast, BPSK (binary phase shift keying) system transmits 1 bit per symbol and QPSK (quadrature phase shift keying) system transmits 2 bits per symbol while requiring the same RF (radio frequency) bandwidth for a given symbol rate.

The M states in a high order M-QAM constellations are more closely spaced than in BPSK or QPSK constellations and therefore require lower noise relative to the average carrier power to eliminate errors. The RMS (root mean square) phase noise of the local oscillators, after being filtered by demodulator, must be sufficiently low to not cause bit errors. For a QPSK or M-PSK schemes (or systems), a multitude of carrier recovery algorithms exist that provide a high phase noise tolerance. However, those algorithms fail when applied to most of the higher order QAM constellations because these lack equidistant phases. Additionally, it has been shown that most of decision-directed carrier recovery is also not a viable option for higher order QAM constellations due to the inevitable relatively long feedback delay (or latency) in practical systems.

The present invention provides a phase noise tolerant method with very low latency by combining the decision feedback equalizer (DFE) and the carrier recovery loop effectively.

REFERENCES

Cheng-I Hwang, David W. Lin, "Joint Low-Complexity Blind Equalization, Carrier Recovery, and Timing Recovery with Application to Cable Modem Transmission", IECE Trans., Commun., Vol. E82-B, No. 1 Jan. 1999

SUMMARY OF THE INVENTION

The present invention is related to a method and apparatus for mitigating phase noise in data communication system. The present invention provides effective phase noise mitigation with very low latency by effectively combing decision feedback equalizer (DFE) and carrier recovery loop.

DETAILED DESCRIPTION OF THE PREFERRED EMBODIMENT

Glossary of Terms

Figure 1:
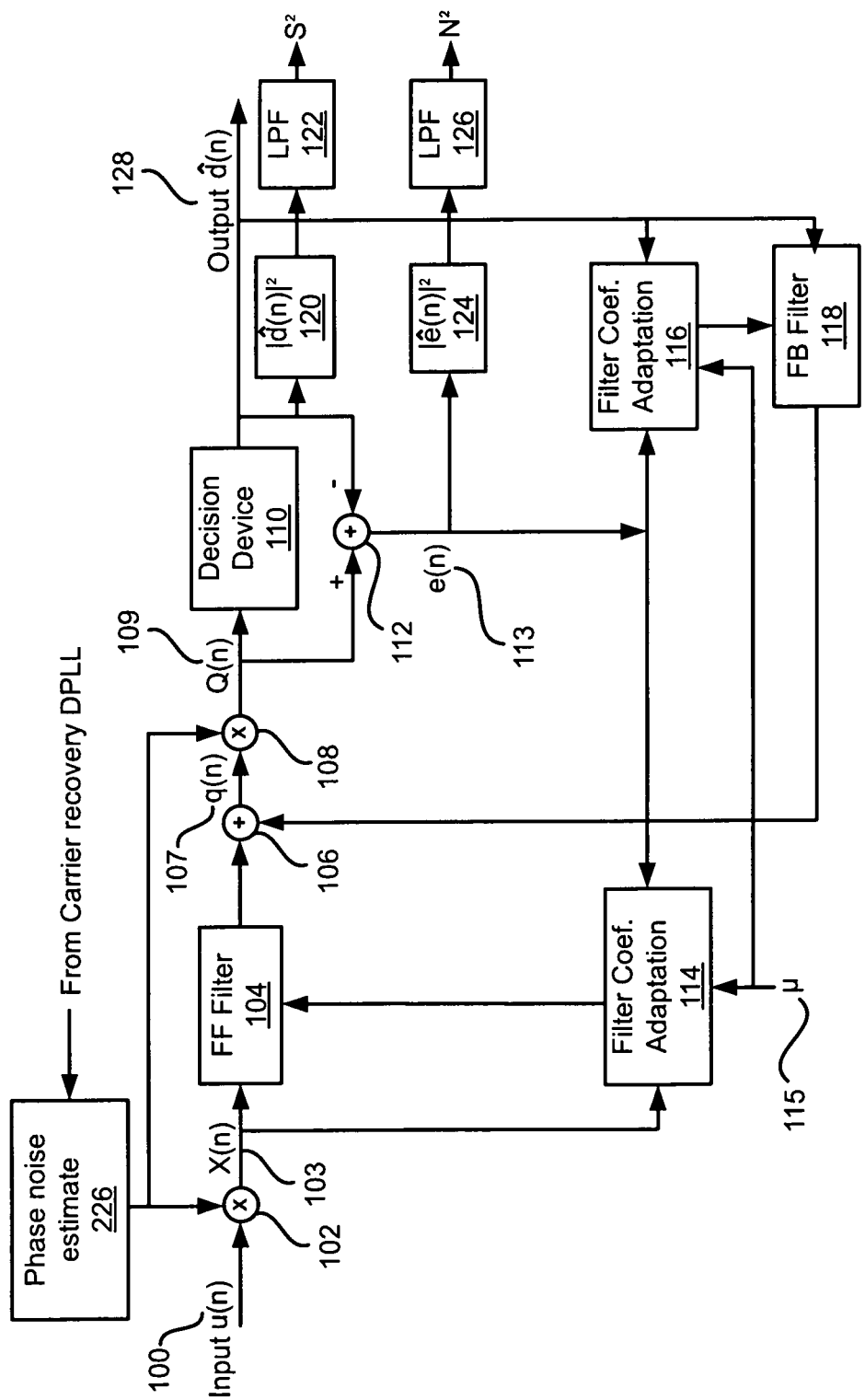
FIG. 1 is a circuit diagram of the present invention.

Input Signal u(n): An input signal is a noisy signal that is the input of the phase noise compensator. The output of the phase noise compensator is the phase noise compensated input signal x(n).
Decision feedback equalizer (DFE): A DFE is a nonlinear equalizer that automatically adapts to time varying properties of the communication channel. It is frequently used in coherent modulation systems to mitigate the channel effect and the inter symbol interference in the received data.
Phase Noise Compensator: a complex multiplier that is used to reduce phase noise by multiplying the negative value of the phase noise estimate with the phase noisy signal.
Phase Noise Compensated Input Signal x(n): The phase noise compensated signal is obtained from the output of phase noise compensator. The phase noise compensated signal which is the input to the FFF in DFE is x(n).
Feedforward Filters (FFF): FFF consists of finite impulse response filter. FFF combines delayed versions of signals to mitigate the channel effect in the received input signal.
Adder: adds input signals together to produce an output signal.

Output Signal of the DFE q(n): a signal that outputs from the DFE. The output signal of the DFE, q(n), is used as the input of the phase noise compensator to generate DD input signal Q(n).

Phase Noise Compensated Signal: A signal after it is compensated for phase noise.

Decision Device (DD) Input Signal Q(n): A phase noise compensated signal from the phase noise compensator. It is an input signal that is received into a decision device.

Error Signal Calculator: an adder that calculates an error signal.

Error Signal e(n): The difference between the DD output and phase noise compensated DFE output.

Filter Coefficient Adaption Block: The function block updates the adaptive filter coefficient iteratively. The function block use the error signal, step size, and input signal of the each filter coefficient.

Step Size $\mu$: a small proportional constant which is used in the Least Mean Squared (LMS) algorithm for adaptive filter coefficient update.

FBF/Feedback Filter: Feedback filter is a part of decision feedback equalizer. It is effective to mitigate inter symbol interference cancellation.

Data Signal Energy Sample: $|\hat{d}(n)|^2$: Energy of data signal sample.

Low Pass Filter: A filter that allows low frequency to pass, but not high-frequency.

Error Signal Energy Sample $|e(n)|^2$: Energy of the Error Signal sample.

Output Signal of the DD $\hat{d}(n)$: An output signal from the decision device.

Input Signal Normalizer: Function block which divide the input signal by the energy of the input signal.

Phase Noise Calculator: A Multiplier that calculates phase noise sample.

Complex Conjugator Block: Function block which apply the conjugate function on the input complex signal.

Imaginary Part Selector Block: The function block which takes the imaginary part of the input complex signal.

Symbol Delay Operator: A block that introduces a symbol delay to a signal.

Phase Noise Estimate Block: A block that converts a phase noise estimate into a complex number using complex number conversion function.

Equalization

Equalization is used to mitigate the channel effect on the signal for reliable communication. The equalizer estimates the communication channel distortion (such as amplitude distortion, phase distortion, fading, and interference, etc.) and mitigates the channel effect by compensating the channel distortion on the received signal.

In micro-wave or millimeter-wave communications that use high radio carrier frequency, the phase noise is high because the amount of phase noise is proportional to the carrier frequency used. In communication systems such as these, one of the most powerful solutions to fight against phase noise is to combine the equalizer with carrier recovery while exploiting the latency reduction between phase noise estimation and correction.

We use a fractional or symbol spaced decision feedback equalizer (DFE) to mitigate the channel effect and inter-symbol interference. The DFE consists of two sections in equalizer: one is Feed Forward Filter (FFF) and the other is Feedback Filter (FBF). Both the FFF and FBF consist of a finite impulse response (FIR) filter.

FIG. 1 is the function block diagram of the DFE which gets the phase noise estimate from carrier recovery loop. The input signal of the DFE, u(n) 100, is the transmitted signal through the noisy communication channel from the transmitter and is the signal received at the receiver. This is a noisy signal. The output signal, q(n) 107, of the DFE is the summation of the output signal of the FFF 104 and the output signal of the FBF 118 in the adder 106. The output signal, $\hat{d}(n)$ 128, of the DD 110 is used in the decoder.

The phase noise correction (or compensation) is obtained by multiplying the respective input signal of the DFE, u(n) 100, and the output signal, q(n) 107, of the DFE with the negative value of the phase noise estimate 226, which is obtained from the carrier recovery DPLL (digital phase locked loop) in the multipliers 102 and 108, respectively. The multiplier 102 is the name of the hardware component and its function is a phase noise compensator. The phase noise compensated signal, Q(n) 109, is the input of the DD 110. The DD 110 uses the input signal, Q(n) 109, to find its output from M QAM constellation by finding one of the M signal constellation points which is closest to the input signal, Q(n) 109, and selects the closest signal point to Q(N) 109 as the output signal, $\hat{d}(n)$ 128, of the DD 110. The error signalm, e(n) 113, is obtained by subtracting the output signal, $\hat{d}(n)$ 128, from the input signal, Q(n) 109, of the DD 110 in the adder 112, which is the error signal calculator.

The error signal, e(n) 113, the phase noise compensated input signal, x(n) 103, and the step size, $\mu$ 115, are used in the filter coefficient adaption block 114 to update the filter coefficient of the FFF 104. The error signal, e(n) 113, the output signal, $\hat{d}(n)$ 128, and the step size, $\mu$ 115 are used in filter coefficient adaption block 116 to update the filter coefficient of the FBF 118.

Both the FFF 104 and the FBF 118 are asymmetric complex FIR filters. The least mean square (LMS) algorithm can be used to update the filter coefficients in both the FFF 104 and the FBF 118. The step size ($\mu$) used for the filter coefficient update in the LMS algorithm is programmable.

The filter coefficient adaption blocks of 114 and 116 performs filter coefficient update process based on the following procedures;

a) Calculate the output signal q(n) 107 of the DFE in the adder 106;

$$q(n) = \sum_{k=1}^{K} f_k(n) x_k(n-k) + \sum_{l=1}^{L} b_l(n) \hat{d}_l(n-l)$$

b) Calculate the phase noise compensated signal Q(n) 109;

$$Q(n) = q(n) e^{-j\hat{\theta}_{n-\Delta}} = \hat{d}_n e^{j\hat{\theta}_n}$$

where K and L are filter order of FFF and FBF, respectively, $\theta_{n-\Delta}$ is the phase noise estimate obtained from carrier recovery loop, and $\hat{\theta}_n$ is the residual phase noise after phase noise compensation.

c) Generate the output signal, $\hat{d}(n)$ 128, of the DD 110 based on Q(n) 109 using the selection process mentioned above.

d) Calculate the error signal e(n) 113 by subtracting the output signal $\hat{d}(n)$ 128 from the phase noise compensated input signal Q(n) 109;

$$e(n) = Q(n) - \hat{d}(n),$$

e) Update the filter coefficients of the FFF 104 and FBF 118 using the LMS algorithm as follows;

$$f_k(n+1) = f_k(n) + \mu * e(n) * x_k(n), k=1,2,\ldots,K$$

$$b_l(n+1) = b_l(n) + \mu * e(n) * \hat{d}_l(n), l=1,2,\ldots,L$$

for FF filter and FB filter, respectively. Where $f_k(n)$ and $f_k(n+1)$ are present $k^{th}$ FFF coefficient and next $k^{th}$ FFF coefficient, respectively. The $b_l(n)$ and $b_l(n+1)$ are present $l^{th}$ FBF coefficient and next $l^{th}$ FBF coefficient, respectively. The $x_k(n)$ and $\hat{d}_l(n)$ are the input of filter coefficient of the $k^{th}$ FFF and the input of $l^{th}$ filter coefficient of the FBF, respectively.

The signal to noise ratio (SNR) estimate is obtained by applying a time averaging first low pass filter (LPF) 122 on the data energy estimate, $|\hat{d}(n)|^2$ 120, of the data signal and by applying a time averaging second low pass filter (LPF) 126 on the error energy estimate, $|e(n)|^2$ 124, of the error signal using 1-pole IIR (infinite impulse response) filter as follows;

$$S^2(n)=\alpha S^2=(n-1)+(1-\alpha)\hat{d}(n)\hat{d}\cdot(n)=\alpha S^2(n-1)+(1-\alpha)|\hat{d}(n)|^2$$

$$N^2(n)=\alpha N^2(n-1)+(1-\alpha)e(n)e^*(n)=\alpha N^2(n-1)+(1-\alpha)|e(n)|^2$$

$$\text{SNR}=10*\log 10(S^2(n)/N^2(n)),$$

Where is $S^2(n)$ the signal energy, $N^2(n)$ is the noise energy, and a is an average parameter of the LPF 126. The value of the $\alpha$ is $0<\alpha<1$ and is close to 1.

Carrier Recovery

Figure 2:
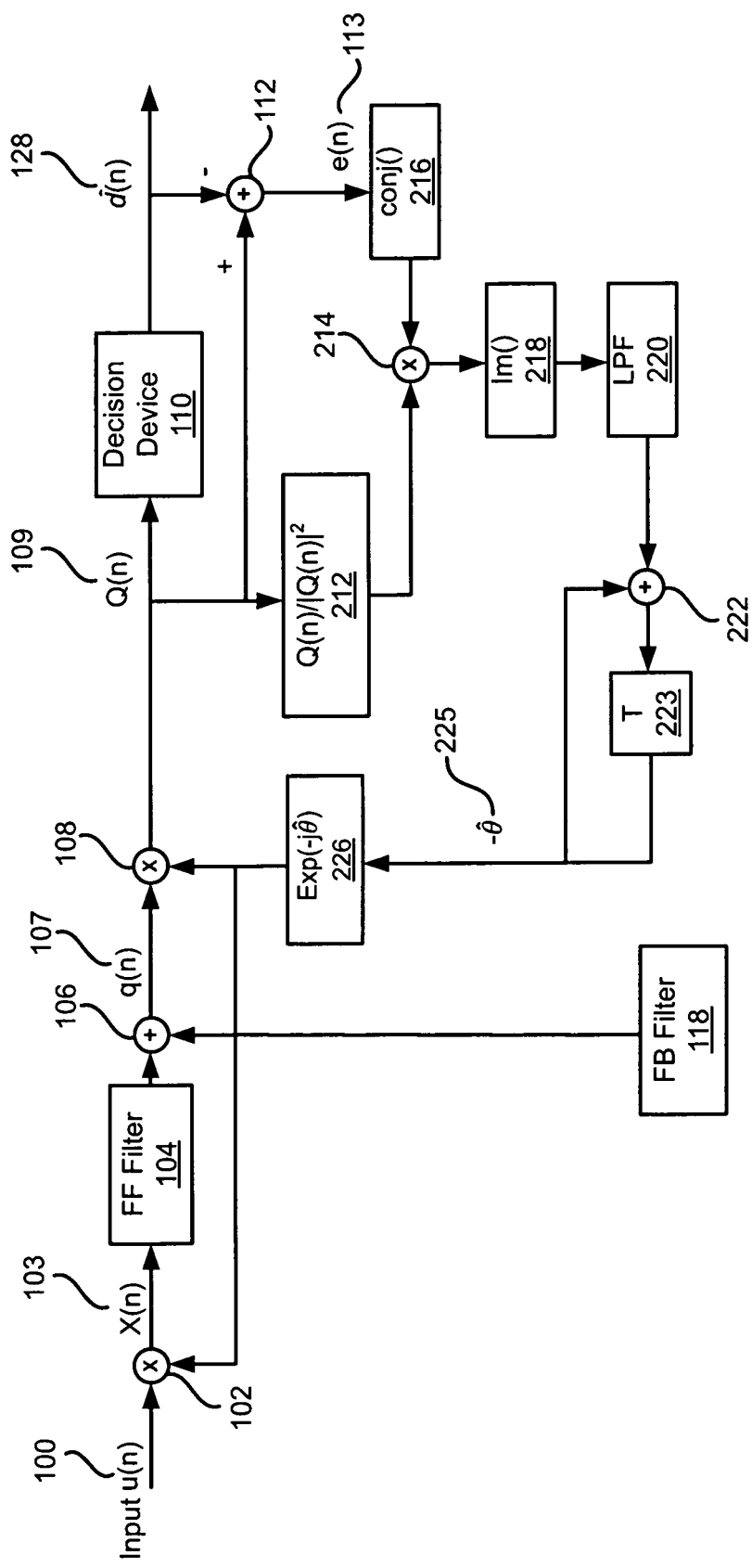
FIG. 2 is a circuit diagram of the present invention.

FIG. 2 is the function block diagram of the carrier recovery loop (CRL) combined with the part of the DFE that is designed for joint detection, estimation, and compensation of the phase noise. In FIG. 2, the carrier recovery loop consists of the multiplier (phase noise compensator) 108, the DD 110, the adder (error signal calculator) 112, the complex conjugator 216, DD input signal normalizer 212, multiplier (phase noise calculator) 214, imaginary part selector 218, low pass filter 220, the oscillator which consists of the adder 222 and one symbol delay operator 223, and the phase noise estimator 226. The CRL is a $2^{nd}$ order type II digital phase locked loop (DPLL) operating at the symbol rate. The CRL tracks the phase error at the input of the DD 110 in the DFE. In FIG. 2, the part of DFE consists of the multiplier (phase noise compensator) 102, the FFF 104, the multiplier (phase noise compensator) 108, the DD 110, the adder (error signal calculator) 112, and the FBF 118.

The signal processing used to obtain the phase noise compensated signal Q(n) 109, the output signal $\hat{d}(n)$ 128, and the error signal e(n) 113 from the input signal u(n) 100 in FIG. 2 is the same as those explained above in DFE section.

The input signal u(n) 100 of the DFE is the signal transmitted through the noisy communication channel from the transmitter and is the received signal at the receiver, which is a noisy signal. The output signal q(n) 107 of the DFE is the summation of the output signal of the FFF 104 and the output signal of the FBF 118 in the adder 106. The output signal $\hat{d}(n)$ 128 of the DD 110 can be used in the decoder.

The phase noise correction (or compensation) is obtained by multiplying the respective input signal of the DFE, u(n) 100, and the output signal of the DFE, q(n) 107, with the negative value of the phase noise estimate 226, which is obtained from carrier recovery DPLL (digital phase locked loop) in the multipliers 102 and 108, respectively. The phase noise compensated signal, Q(n) 109, is the input of the DD 110. The DD 110 uses the input signal Q(n) 109 to find its output from M QAM constellation by finding one of the M signal constellation points which is closest to the input signal, Q(n) 109, and selects the closest signal point to Q(N) 109 as the output signal 128, of the DD 110. The error signal e(n) 113 is obtained by subtracting the output signal $\hat{d}(n)$ 128 from the input signal Q(n) 109 of the DD in the adder 112 (error signal calculator). a3

The CRL uses the DD input Q(n) 109 and the error signal e(n) 113 to obtain the phase noise estimate. The CRL obtains the phase noise estimates based on the following procedure;

a) Obtain the input signal, x(n) 103, of the FFF by performing the phase noise correction (or compensation) by multiplying the input signal, u(n) 100, of the DFE with the negative value of the phase noise estimate 226 that is obtained from the carrier recovery DPLL (digital phase locked loop);

$$x(n)=u(n)e^{-j\theta}$$

b) Obtain the phase noise compensated input signal of the DD (DD input), Q(n) 109, by performing the phase noise correction (or compensation) by multiplying the output signal, q(n) 107, of the DFE with the negative value of the phase noise estimate 226 which is obtained from carrier recovery DPLL (digital phase locked loop);

$$Q(n)=q(n)e^{-j\hat{\theta}_n}\cdot\Delta=\hat{d}(n)e^{j\hat{\theta}_n}$$

where $\hat{\theta}_{n-\Delta}$ is the phase noise estimate obtained from the carrier recovery loop, and $\hat{\theta}_n$ is the residual phase noise after phase noise compensation.

c) Generate the output signal, $\hat{d}(n)$ 128, of the DD 110 based on the DD input, Q(n) 109, using the selection process mentioned above.

d) Calculate the error signal e(n) 113 (or $DD_{Noise}$) by subtracting the DD output signal, $\hat{d}(n)$ 128, from the DD input signal, Q(n) 109;

$$e(n)=Q(n)-\hat{d}(n)$$

e1) Calculate the output signal, q(n) 107, of the DFE in the adder 106;

$$q(n) = \sum_{k=1}^{K} f_k(n)x_k(n-k) + \sum_{l=1}^{L} b_l(n)\hat{d}_l(n-l)$$

where K and L are the filter order of FFF and FBF, respectively.

e2) Calculate the normalized DD input, N_Q, by dividing the DD input signal, Q(n) 109, by the energy of the DD input signal, $|Q(n)|^2$, in the DD input signal normalizer 212;

$$N_Q \triangleq Q_n/|Q_n|^2$$

f) Calculate the complex conjugate value of the DD error, CC_DE, by applying the complex conjugate function on the DD error signal, e(n) 113, in the complex conjugator block 216;

$$CC\_DE \triangleq e\cdot(n)^*=(n)-\hat{d}(n))^*$$

g) Calculate the normalized DD error, N_E, by multiplying the complex conjugate of the DD error signal with the normalized DD input, N_Q, in the multiplier 214;

$$N\_E \triangleq \frac{e(n)^* Q(n)}{|Q(n)|^2} = (Q(n)-\hat{d}(n))^* \frac{Q(n)}{|Q(n)|^2}$$

h) Calculate the phase noise sample by taking the imaginary part of the normalized DD error signal in the imaginary part selector 218;

Phase noise sample $$\triangleq \text{Im}\left\{(Q(n)-\hat{d}(n))^* \frac{Q(n)}{|Q(n)|^2}\right\}$$

i) Calculate the phase noise estimate by taking the time averaging on the phase noise samples. The time averaging is achieved by passing the phase noise samples to the low pass filter 220 and then to the oscillator which is consisted of the adder 222 and the symbol delay operator 223 in the digital phase locked loop (DPLL);

Phase noise estimate $$\triangleq E\left[\text{Im}\left\{(Q(n)-\hat{d}(n))^* \frac{Q(n)}{|Q(n)|^2}\right\}\right] = E\left[\text{Im}\left\{1-e^{j\hat{\theta}}\right\}\right]$$

$\approx E[-\hat{\theta}_n] = -\hat{\theta}$, when $\hat{\theta}_n$ is small j) Convert the phase noise estimate into complex valued phase noise estimate using the phase noise estimator 226 and then perform phase noise correction (or compensation) by multiplying the respective input signal of the DFE, u(n) 100, and the output signal, q(n) 107, of the DFE-with the negative value of the phase noise estimate 226, which is obtained from carrier recovery DPLL (digital phase locked loop) in the multipliers 102 and 108, respectively, and then generate the input signal, x(n) 103, of the FFF and the input signal, Q(n) 109, of the DD;

$x(n)=u(n)e^{-j\hat{\theta}}$ $Q(n)=q(n)e^{-j\hat{\theta}}$

Figure 3:
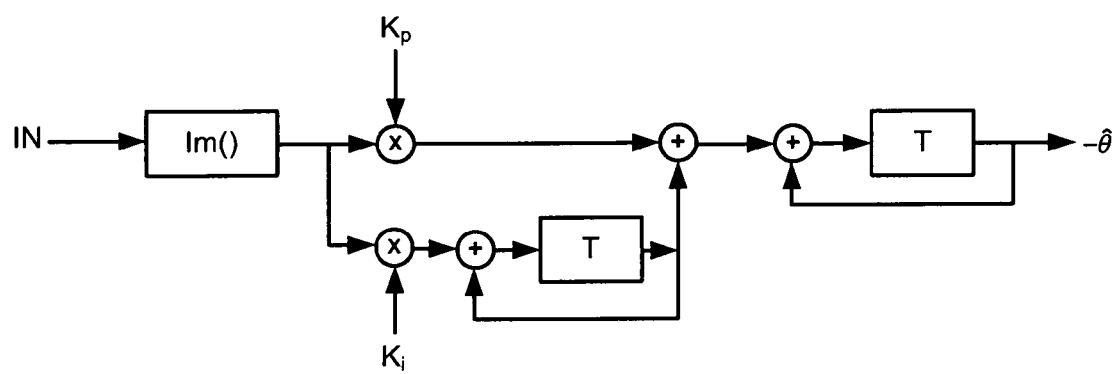
FIG. 3 is a diagram of the present invention.
The following callout list of elements can be a useful guide in referencing the elements of the drawings.
100 DD/Input Signal of the DFE u(n)
102 Multiplier/Phase Noise Compensator
103 Phase Noise Compensated Input Signal x(n)
104 FFF/Feed Forward Filter
106 Adder
107 Output Signal of the DFE q(n)
108 Multiplier/Phase Noise Compensator/Second Phase Noise Compensator
109 Phase Noise Compensated Signal/Input Signal Q(n)
110 The DD
112 Adder/Error Signal Calculator
113 Error Signal e(n)
114 Filter Coefficient Adaption Block
115 Step Size µ
116 Filter Coefficient Adaption Block
118-FBF/Feedback Filter
120 Data Signal energy sample $|\hat{d}(n)|^2$
122 First Low Pass Filter
124 Error Energy Estimate of the Error Signal $|e(n)|^2$
126 Second Low Pass Filter
128 Output Signal of the DD $\hat{d}(n)$
212 DD Input Signal Normalizer
214 Phase Noise Calculator
216 Complex Conjugator Block/Complex Conjugator
218 Imaginary Part Selector Block/Imaginary Part Selector
220 Low Pass Filter
222 Adder
223 Symbol Delay Operator/Symbol Delay Block
226 Phase Noise Estimate/Phase Noise Estimate Block/Complex Number Conversion Block

The LPF (low pass filter) in the Digital Phase Locked Loop (DPLL) in the above FIG. 2 is used for phase noise averaging purpose. The LPF used in DPLL is a classic filter. The LPF in the DPLL has two signal paths in it; one is a proportional path and the other is an integration path as shown in the following FIG. 3. As can be seen in the FIG. 3, the proportional path gain $K_p$ and integration path gain $K_i$ in the LFP determines the bandwidth of the carrier recovery loop filter. Note that the T in FIG. 3 represents one symbol delay operator.

The carrier recovery loop supports a range of loop bandwidths designed to maximize phase noise tracking capability and minimize the effect of Additive White Gaussian Noise (AWGN). We need to optimize the loop bandwidth based on expected Signal to Noise Ratio (SNR) and phase noise.

What is claimed is:

1. A wireless communication apparatus that combines DFE and carrier recovery systems, designed for phase noise estimation and correction, comprising:
   an electric circuit, wherein the electric circuit is configured to:
   a. obtain a phase noise compensated input signal of the FFF by performing a phase noise correction (or compensation) by multiplying an input signal of a DFE with a negative value of a phase noise estimate which is obtained from carrier recovery DPLL (digital phase locked loop);
   b. obtain a phase noise compensated input signal of the DD by performing the phase noise correction (or compensation) by multiplying an output signal of the DFE with the negative value of the phase noise estimate which is obtained from carrier recovery DPLL (digital phase locked loop);
   c. generate a DD output by finding one of a M signal constellation points which is closest to the phase noise compensated DD input signal in DD;
   d. calculate a DD error signal by subtracting a DD output from the DD input signal; generating the DFE output by operating the DFE using the phase noise compensated input signal of the FFF- and the DD output as an input of FBF; calculating a normalized DD input-signal by dividing the DD input signal by an energy of the DD input signal; calculating a normalized DD error by multiplying a complex conjugate of the DD error signal with the normalized DD input signal;
   e. calculate a phase noise sample by taking an imaginary part of the normalized DD error; obtaining a phase noise estimate by passing the phase noise samples to a low pass filter (LPF) and then to an oscillator in the digital phase locked loop (DPLL); finally, performing phase noise correction by multiplying a respective input signal of the FFF and an output signal of the DFE with the negative value of the phase noise estimate;
   wherein the electric circuit further comprises:
   a multiplier operating as a phase noise compensator;
   a DD output generator that generates the DD output by finding one of the M signal constellation points which is closest to the phase noise compensated DD input signal in DD;
   a DD error signal calculator that calculates the DD error signal by subtracting the DD output from the DD input signal;
   a normalized DD input-signal calculator that calculates the normalized DD input signal by dividing the DD input signal by the energy of the DD input signal;
   a normalized DD error calculator that calculates the normalized DD error by multiplying the complex conjugate of the DD error signal with the normalized DD input signal;
   a phase noise sample calculator that calculates the phase noise sample by taking the imaginary part of the normalized DD error; and
   a phase noise corrector that corrects phase noise by multiplying the respective input signal of the FFF and the output signal of the DFE with the negative value of the phase noise estimate.

2. A wireless communication apparatus of claim 1, wherein the electric circuit is configured to obtain the phase noise compensated input signal of the FFF by performing the phase noise correction or compensation by multiplying the input signal of the DFE with the negative value of the phase noise estimate which is obtained from carrier recovery DPLL (digital phase locked loop).

3. A wireless communication apparatus of claim 1, wherein the electric circuit is configured to obtain the phase noise compensated input signal of the DD or the DD input, wherein the phase noise compensated input signal of the DD (or DD input) is obtained by performing the phase noise correction (or compensation) by multiplying the output signal of the DFE with the negative value of the phase noise estimate which is obtained from carrier recovery DPLL (digital phase locked loop).

4. A wireless communication apparatus of claim 3, wherein the electric circuit is configured to obtain a signal energy sample by multiplying a DD output with a complex conjugate of the DD output.

5. A wireless communication apparatus of claim 1, wherein the electric circuit is configured to obtain the DD by finding one of the M signal constellation points which is closest to the phase noise compensated DD input signal in DD and by selecting the constellation point as the DD output.

6. A wireless communication apparatus of claim 1, wherein the electric circuit is configured to obtain the DD error signal by subtracting the DD output from the DD input signal.

7. A wireless communication apparatus of claim 1, wherein the electric circuit is configured to obtain the DFE output by operating the DFE and a filter coefficient update processing, wherein the filter coefficient update process uses the phase noise compensated input signal of the FFF, the DD output signal, the DD error signal, and a step size.

8. A wireless communication apparatus of claim 1, wherein the electric circuit is configured to obtain the normalized DD input signal by diving the DD input signal by the energy of the DD input signal.

9. A wireless communication apparatus of claim 1, wherein the electric circuit is configured to obtain the normalized DD error by multiplying the complex conjugate of the DD error signal with the normalized DD input signal.

10. A wireless communication apparatus of claim 1, wherein the electric circuit is configured to obtain the phase noise sample by taking the imaginary part of the normalized DD error.

11. A wireless communication apparatus of claim 1, wherein the electric circuit is configured to obtain the phase noise estimate by passing the phase noise samples to the low pass filter (LPF) and then to the oscillator in the digital phase locked loop (DPLL).

12. A wireless communication apparatus of claim 1, wherein the electric circuit is configured to obtain phase noise correction (or compensation) by multiplying the respective input signal of the FFF and the output signal of the DFE with the negative value of the phase noise estimate.

13. A wireless communication apparatus of claim 1, wherein the electric circuit is configured to estimate signal to noise ratio (SNR) by:
   a. calculating a signal energy sample by multiplying the DD output signal with the complex conjugate of the DD output signal;
   b. calculating a signal energy estimate by averaging the signal energy sample using 1-pole IIR (infinite impulse response) filter or low pass filter (LPF); calculating the DD error signal by subtracting the DD output signal from the DD input signal;
   c. calculating a noise energy sample by multiplying the DD error signal with the complex conjugate of the DD error signal;
   d. calculating a noise energy estimate by averaging the noise energy sample using 1-pole IIR (infinite impulse response) filter or LPF; and
   e. calculating SNR by dividing the signal energy estimate by noise energy estimate.

14. A wireless communication apparatus of claim 13, wherein the electric circuit is configured to obtain the signal energy estimate by averaging the signal energy sample using 1-pole IIR (infinite impulse response) filter or low pass filter (LPF).

15. A wireless communication apparatus of claim 13, wherein the electric circuit is configured to obtain the DD error signal by subtracting a DD output from a noise compensated DD input; wherein the electric circuit is configured to obtain the phase noise compensated input signal of the DD or the DD input, wherein the phase noise compensated input signal of the DD (or DD input) is obtained by performing the phase noise correction (or compensation) by multiplying the output signal of the DFE with the negative value of the phase noise estimate which is obtained from carrier recovery DPLL (digital phase locked loop); wherein the electric circuit is configured to obtain the DD by finding one of the M signal constellation points which is closest to the phase noise compensated DD input signal in DD and by selecting the constellation point as the DD output.

16. A wireless communication apparatus of claim 13, wherein the electric circuit is configured to obtain the noise energy sample by multiplying the DD error signal with the complex conjugate of the DD error signal.

17. A wireless communication apparatus of claim 13, wherein the electric circuit is configured to obtain a noise energy estimate by averaging the noise energy sample using 1-pole IIR (infinite impulse response) filter or LPF.

18. A wireless communication apparatus of claim 13, wherein the electric circuit is configured to obtain the signal to noise ratio (SNR) by dividing the signal energy estimate by noise energy estimate.

* * * * *